United States Patent [19]

Ellzey

[11] Patent Number: 5,653,421

[45] Date of Patent: Aug. 5, 1997

[54] FLUID SWITCH

[75] Inventor: Steven James Ellzey, Grand Prairie, Tex.

[73] Assignee: Lockheed Martin Vought Systems Corporation, Grand Prairie, Tex.

[21] Appl. No.: 677,017

[22] Filed: Jul. 8, 1996

[51] Int. Cl.[6] .................................................. F15B 13/044
[52] U.S. Cl. ........................................ 251/129.1; 251/297
[58] Field of Search ................................. 251/129.1, 297, 251/129.07, 282

[56] References Cited

U.S. PATENT DOCUMENTS

| | | | |
|---|---|---|---|
| 2,407,184 | 9/1946 | Sparrow | 251/129.1 |
| 4,353,394 | 10/1982 | Loup | 251/297 X |
| 4,354,526 | 10/1982 | Hodgson . | |
| 4,522,373 | 6/1985 | Shelbourn et al. | 251/297 |
| 4,936,346 | 6/1990 | Kugler | 251/297 X |
| 4,946,130 | 8/1990 | Kooiman . | |
| 4,989,829 | 2/1991 | Bickel . | |
| 5,106,053 | 4/1992 | Miller et al. . | |
| 5,242,149 | 9/1993 | Sikkema . | |
| 5,314,163 | 5/1994 | Bacardit . | |

FOREIGN PATENT DOCUMENTS 2821588  11/1978  Germany .

*Primary Examiner*—Kevin Lee
*Attorney, Agent, or Firm*—Sidley & Austin

[57] ABSTRACT

A fluid switch suitable for use as a fuel shut-off valve is disclosed. In one aspect, the fluid switch includes a housing defining a generally cylindrical bore and having an inlet port, an outlet port and a detent spring passage. A valve member having a spool portion and a detent portion is slidably disposed within the bore. The spool portion can selectively close or open the ports with respect to one another. A detent spring is inserted through the detent spring passage and across the bore to interfit with the detent portion of the valve member to maintain it in the open or closed position in the absence of control inputs. A solenoid core attached to the valve member and solenoid coils surrounding the housing may be provided for moving the valve member between the open and closed positions to operate the fluid switch.

18 Claims, 2 Drawing Sheets

FLUID SWITCH

BACKGROUND OF THE INVENTION

Many types of fluid flow control devices are known. One such device in widespread service is known as a spool valve. A spool valve generally comprises a housing defining a cylindrical bore having a valve member slidably disposed therewithin. The valve is opened or closed by changing the position of the valve member in relation to inlet and outlet ports formed in the housing. Some spool valves are used to produce variable flow volumes in response to a varying input signal. Such devices may be known as proportional valves or throttle valves. Other spool valves are used only to fully open or fully close a flow path in response to an input signal. Such devices may be known as fluid switches. One application for fluid switches is to serve as a fuel cut off valve in the fuel system of a vehicle.

In many applications, especially those in which the fluid switch will be incorporated into a low cost or expendable unit, it is desirable to make the switch both reliable and inexpensive. Experience has shown that the reliability of a device is often related to the number of components it contains, especially the number of moving components. Experience has also shown that the cost of a device is often related to the number of components it incorporates, to the complexity of fabricating these components, and to the complexity of assembling the components into a finished device. A need therefore exists, for a fluid switch having a small number of components, especially moving components, and where these components are simple to fabricate.

In many applications, it is desirable that the fluid switch maintain a given flow state (i.e., "on" state with full flow or "off" state with flow cut off), in the absence of a continuous control input. Various types of locking mechanisms or feedback circuits are known in the prior art to maintain a given flow state, however, these features typically add to the number and complexity of the parts in each unit, thereby adversely influencing the cost or reliability of the device. A need therefore exists, for a fluid switch that maintains a given flow state in the absence of a continuous control input, yet has only a small number of components which are simple to fabricate.

In many applications, a fluid switch is provided with a means for positioning the valve member so as to select the desired flow state. Solenoids are often used for these positioning means as they provide a ready method for transforming an electrical control signal into the mechanical input needed to position the valve means. The application of solenoids for the positioning of spool valves is well known, however, in many applications a constant current is required through the solenoid core to maintain a fluid switch in a given flow state. Maintaining a constant current through a solenoid coil requires an increased use of electrical power and may complicate the design of control circuitry compared to a "single pulse" control input. A need therefore exists for a solenoid operated fluid switch that requires only a single pulse to change flow states and does not require constant current to maintain a given flow state.

SUMMARY OF THE INVENTION

According to a broad aspect, the current invention relates to a fluid switch comprising a housing defining a generally cylindrical bore, a valve member slidably disposed within said bore and a detent spring. The valve member has a spool portion, which has a rod section of reduced diameter connected longitudinally between two piston sections, and a detent portion, which has a first and second tapered groove section and an intermediate section therebetween. The spool portion and detent portions are attached to one another and the valve member is oriented within the bore to position the detent portion longitudinally adjacent to a detent spring passage formed in the housing and the spool portion longitudinally proximate to inlet and outlet ports formed in the housing. The valve member is positionable within the bore between a first position, when one of the piston sections is longitudinally aligned with the outlet port thereby blocking fluid communication between the inlet and outlet ports to produce an "off" state, and a second position, when the rod section is longitudinally aligned with the inlet and outlet ports thereby allowing fluid communication between the inlet and outlet ports to produce an "on" flow state. The detent spring has an in-bore portion which extends through the detent spring passage across the bore of the housing. The in-board portion of the detent spring has an interference fit with the intermediate section of the detent portion of the valve member when the valve member is between the first and second positions, and the in-bore portion has in interference-free fit with the tapered groove sections of the detent portion of the valve member when the valve member is within the first or second position. Longitudinal movement of the valve member is thereby resisted when the valve member is in the first or second position.

In a preferred embodiment of this invention, the valve member is a body of revolution about its longitudinal axis, thereby allowing the valve member to be fabricated using simple lathe operations. In another embodiment, the in-bore portion of the detent spring comprises a generally straight segment of hardened metal wire, again providing for the simple fabrication of the fluid switch. In yet another embodiment, the detent portion of the valve member comprises an intermediate section having a constant diameter with a value D1 and first and second tapered groove sections having a maximum diameter with a value D1 and a minimum diameter with a value D2, the value D2 being less than the value of D1. In a more preferred embodiment of this aspect, the in-bore portion of the detent spring extends across the bore generally along a line offset from the longitudinal axis by a distance having a value between 0.5 D1 and 0.5 D2. In some embodiments of the invention, the detent portion of the valve member further comprises two stop members positioned longitudinally adjacent to the tapered groove sections on opposite ends of the detent portion. These stop members restrict the valve member from moving longitudinally beyond the range from first to the second position.

Additional preferred embodiments are provided wherein the valve member has a maximum diameter providing an interference-free fit within the bore of the housing and one or more annular ring grooves of reduced diameter formed on each of its piston sections. A resilient O-ring is positioned in each annular ring groove to provide an interference fit with the bore to form a fluid-tight seal. In a more preferred embodiment, two spaced apart annular ring grooves, along with their respective O-rings, are provided on the piston section which is aligned with the outlet port when the valve member is in the first ("off") position.

According to another aspect, the fluid switch further comprises a positioner which moves the valve member in the bore between the first ("off") position and the second ("on") position. This positioner may comprise an electro-mechanical servo actuator.

In yet another aspect, the housing and valve member are formed of substantially non-ferromagnetic materials.

According to a more preferred embodiment of this aspect, the switch further comprises a solenoid core attached to the valve member and two annular solenoid coils disposed around the housing. The solenoid coil is formed of substantially ferromagnetic materials and has a diameter which provides an interference-free fit within the bore. The solenoid coils are positioned longitudinally adjacent one another and have a longitudinal mid-point therebetween. The longitudinal mid-point of the solenoid coils is longitudinally aligned with a longitudinal mid-point of a portion of the bore through which the solenoid core moves when the valve member moves from first position to the second position. In this embodiment, the valve member can be selectively positioned in the first position corresponding to flow cutoff, or the second position, corresponding to open flow, by energizing one solenoid coil or the other for a brief period of time. Once a flow state has been established, the action of the detent spring with the detent portion of the valve member will maintain the valve member in the selected position in the absence of continuous current flow through either solenoid coil.

In a still further aspect, the switch comprises a means for positioning the valve member in the bore between the first position and the second position. This positioning means may comprise additional fluid ports in the housing for applying differential hydraulic or pneumatic pressures to the longitudinal ends of the valve member.

BRIEF DESCRIPTION OF THE DRAWINGS

The invention is illustrated by way of example in the accompanying drawings in which:

FIG. 3A shows the valve member of the fluid switch in the first position, corresponding to fluid cut-off or "off" state;

FIG. 3B shows the valve member of the fluid switch in the second position, corresponding to fluid flow or "on" state;

DETAILED DESCRIPTION

For purposes of consistency in this description, directional references such as longitudinal, longitudinally, etc., relate to directions parallel to the longitudinal axis of the bore and valve member. Directional references such as radial, radially, etc., relate to directions perpendicular to the longitudinal axis of the bore and valve member. In addition, the term "fluid" relates to any substance, including liquids, vapors, and gasses, tending to flow or conform to the outline of its container.

Figure 1:
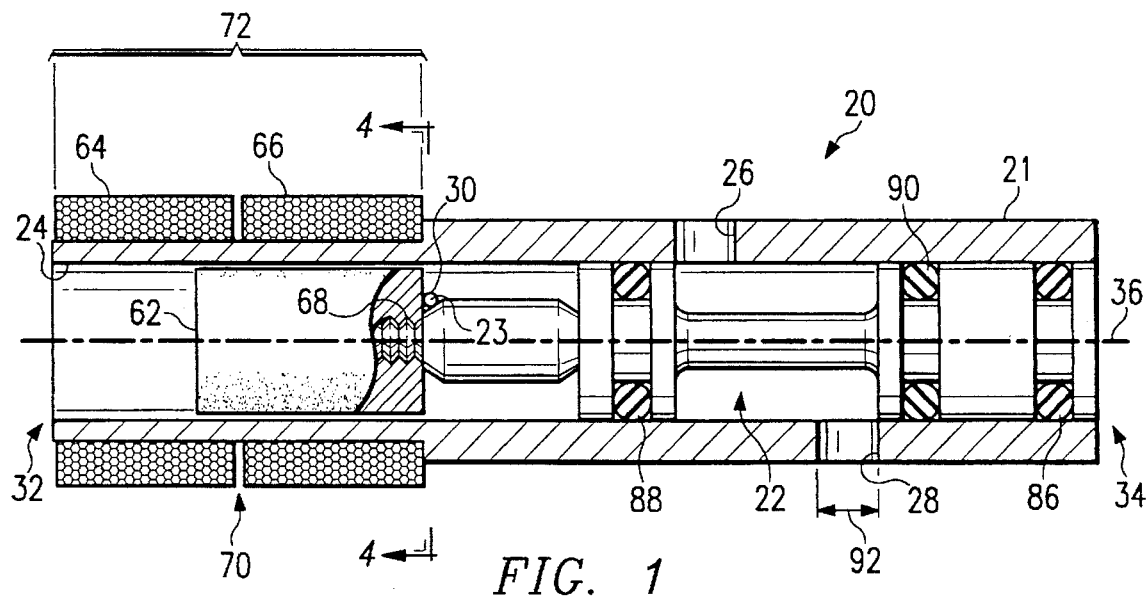
FIG. 1 is a cross-sectional elevation view of a fluid switch according to one aspect of the current invention.

Referring to FIG. 1, a fluid switch according to a preferred embodiment of the current invention is illustrated. This embodiment is suitable to control the flow of liquid fuels, however, other embodiments for the control of other fluids are within the scope of the current invention, as will be readily apparent to those of ordinary skill in the art. Fluid switch 20 comprises a housing 21, valve member 22 and detent spring 23. Housing 21 defines a generally cylindrical bore 24, an inlet port 26, an outlet port 28 and a detent spring passage 30. Bore 24 has a first end 32, a second end 34 and a longitudinal axis 36 therebetween. Inlet and outlet ports 26, 28 are longitudinally spaced apart from one another and in communication with bore 24 to allow fluid flow thereamong (assuming, of course, that other components of the fluid switch do not obstruct such fluid flow). Detent spring passage 30 is formed in housing 21 at a point longitudinally between first end 32 and ports 26, 28. Valve member 22 is slidably disposed within bore 24. Valve member 22 has a longitudinal axis coincident with longitudinal axis 36 of bore 24.

Figure 2A:
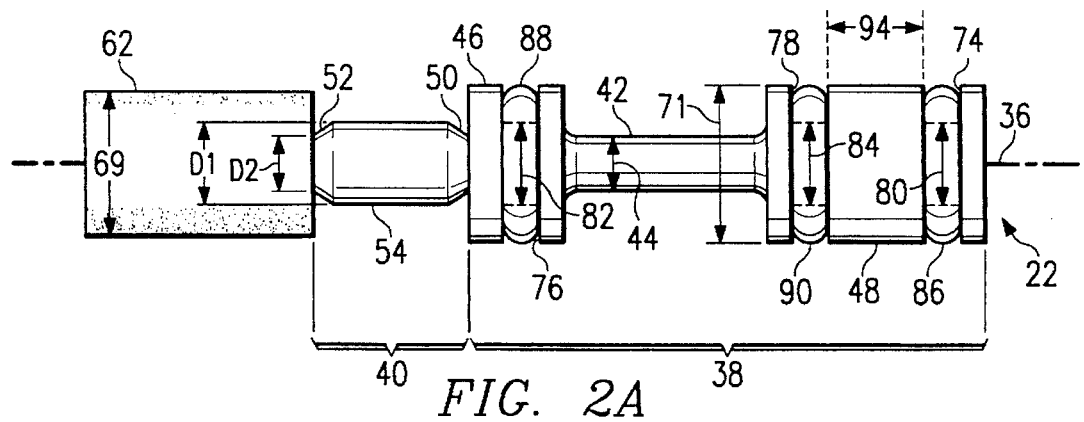
FIG. 2A is a side elevation view of the valve member and solenoid core of the device shown in FIG. 1.

Referring now to FIGS. 1 and 2A, valve member 22 has a spool portion 38 and a detent portion 40. Valve member 22 is oriented in bore 24 to position detent portion 40 longitudinally adjacent detent spring passage 30 and spool portion 38 longitudinally proximate ports 26 and 28. As best seen in FIG. 2A, spool portion 38 includes a rod section 42 having a reduced diameter 44 connected longitudinally between two piston sections 46, 48. Detent portion 40 includes a first and a second tapered groove section 50 and 52, respectively, and an intermediate section 54 therebetween. Each tapered groove section 50 and 52 has a diameter which decreases as the longitudinal distance from intermediate section 54 increases.

Figure 3A:
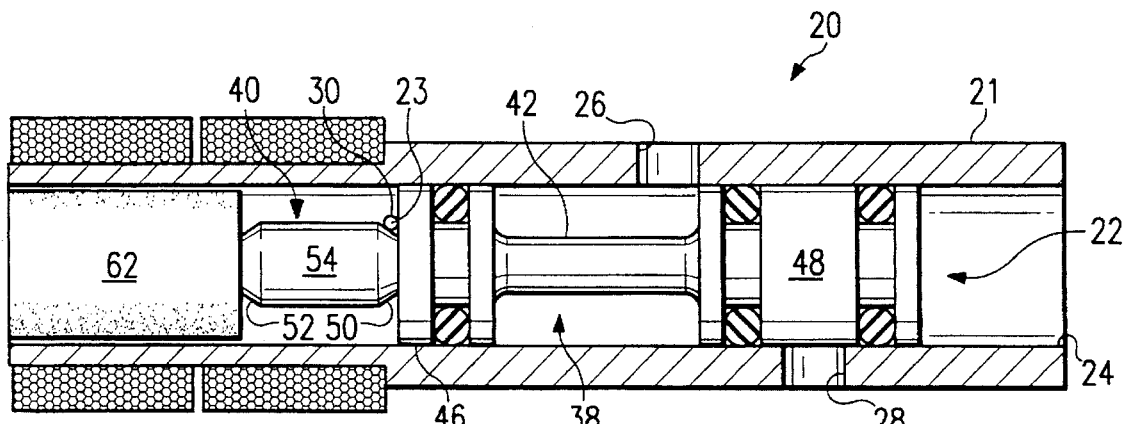
FIGS. 3A and 3B are cross-sectional side elevation views illustrating the fluid switch of FIG. 1.
Figure 3B:
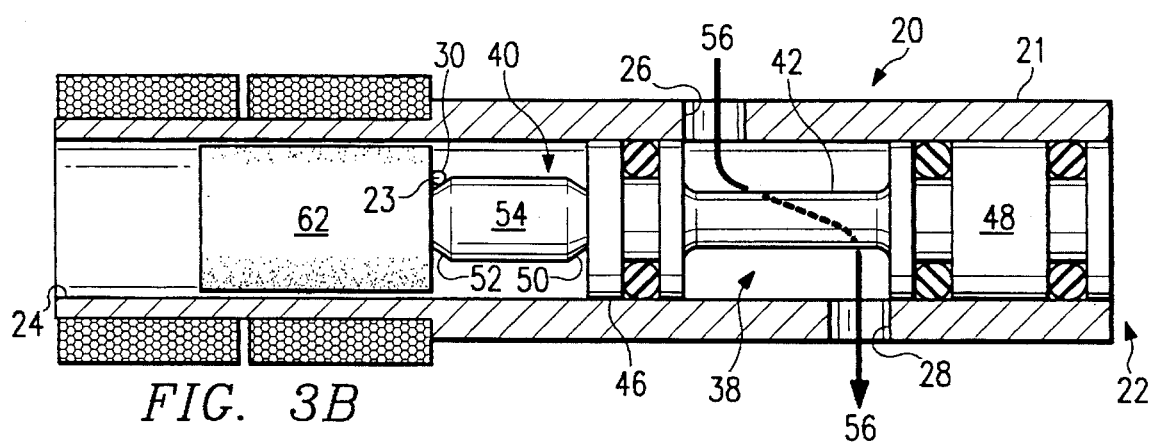

Referring now to FIGS. 3A and 3B, the operation of the fluid switch is illustrated. Valve member 22 can be selectively positioned between a first position, shown in FIG. 3A, and a second position, shown in FIG. 3B. When valve member 22 is in the first position, one of the piston sections 46, 48 of spool portion 38 is longitudinally aligned with inlet port 26 or outlet port 28, thereby blocking fluid communication between the inlet and outlet ports. This configuration represents the fluid switch in the fluid cut-off or "off" state. In the embodiment shown in FIG. 3A, when valve member 22 is in the first position, piston section 48 is aligned with outlet port 28 to block fluid flow between the inlet and outlet ports, however, those skilled in the art will readily appreciate that other configurations having piston sections 46 or 48 longitudinally aligned with ports 26 or 28 to block fluid communication between the ports is within the scope of the current invention. Referring now to FIG. 3B, when valve member 22 is in the second position, rod section 42 of spool portion 38 is longitudinally aligned with both inlet and outlet ports 26, 28, thereby allowing fluid communication between the inlet and outlet ports as indicated by arrow 56. this configuration represents the fluid flow or "on" state. Detent portion 40 of valve member 22 is adapted to position first tapered groove section 50 of detent portion 40 in longitudinal alignment with detent spring passage 30 when valve member 22 is in the first position as shown in FIG. 3A, and to position second tapered groove section 52 in longitudinal alignment with detent spring passage 30 when valve member 22 is in the second position as shown in FIG. 3B.

Detent spring 23 is an elongated, generally straight member that may be formed from a metal wire, a plastic molding or extrusion, composite fibers with or without a reinforcing epoxy matrix, or other materials known in the art for use as springs. Those of ordinary skill in the art will appreciate that an appropriate material for spring 23 can be selected upon consideration of the expected operating conditions of the fluid switch.

Figure 4:
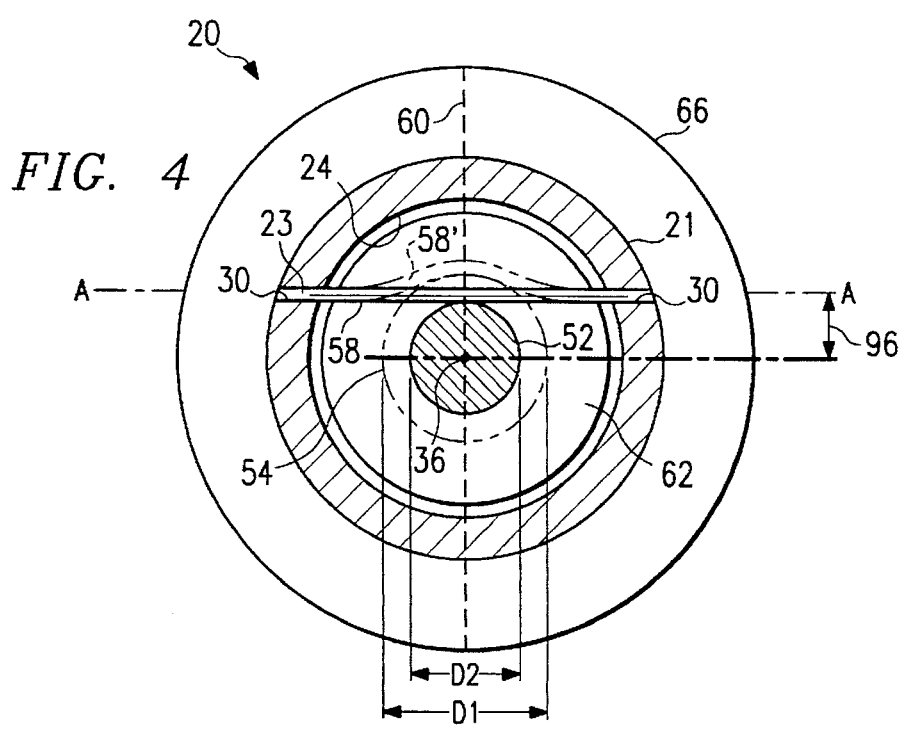
FIG. 4 is a cross-sectional end view taken along line 4—4 of FIG. 1 showing the detent spring and the detent portion of the valve member.

Referring now also to FIG. 4, detent spring 23 has an in-bore portion 58 extending through detent spring passage 30 and across bore 24 generally along a line (shown as A—A in FIG. 4), this line being radially offset from longitudinal axis 36 by an offset distance 96 and perpendicular to a plane 60 passing through the longitudinal axis. In-bore portion 58 has an interference-free fit with tapered groove sections 50, 52 of detent portion 40 when valve member 22 is in first or second position. When valve member 22 is between first and second positions, i.e., when intermediate portion 54 is longitudinally aligned with detent spring passage 30, in-bore portion 58 has an interference fit with intermediate section 54. This interference fit is illustrated in FIG. 4, where in-bore portion 58' (shown in phantom) is shown flexing to accommodate intermediate section 54 (shown in phantom) of detent portion 40 which has a larger diameter than the tapered groove section 52. Note that the differences in diameter between tapered groove 52 and intermediate section 54 of detent portion 40 and the deflection of in-bore portion 58' of detent spring 23 may be somewhat exaggerated in FIG. 4 to better illustrate the interference fit between detent spring 23 and intermediate section 54 of detent portion 40. Thus, when valve member 22 is in either the first position, as shown in FIG. 3A, representing a fluid cut-off or "off" state for switch 20, or the second position as shown in FIG. 3B, representing a fluid flow or "on" state for switch 20, detent spring 23 and detent portion 40 serve to resist the longitudinal movement of valve member 22 and maintain the state of switch 20 in the absence of any constant control input.

In another aspect of the current invention, fluid switch 20 further comprises a positioner (not shown) that moves valve member 22 longitudinally within bore 24 between the first position and the second position. The positioner may comprise first and second portions capable of relative movement therebetween such as an electrical, mechanical, pneumatic or hydraulic servo-actuator. The first portion of the positioner is fixed relative to housing 21. The second portion of the positioner is connected to valve member 22 via a cam, bell crank, push rod, or other mechanical linkage (not shown). Relative movement between the portions of the positioner, e.g., actuating an actuator, causes the valve member to move within bore 24. Those of ordinary skill in the art will readily appreciate that a variety of known devices may be used as a positioner without departing from the scope of the invention.

Alternatively, fluid switch 20 may further comprise a solenoid including a solenoid core and one or more solenoid coils. Solenoids are particularly useful to provide an interface for the use of a fluid switch with an electric or electronic control system. To facilitate the use of solenoid positioning means, in a preferred embodiment of the current invention, housing 21 and valve member 22 are formed of substantially non-ferromagnetic materials, including aluminum, magnesium, brass, plastic, ceramics and other non-ferromagnetic materials known to those of skill in the art. Again referring to FIGS. 1 and 2A, in a more preferred embodiment of the current invention, fluid switch 20 further comprises a solenoid core 62 and two annular solenoid coils 64, 66. Solenoid core 62 is attached to valve member 22. In the embodiment shown FIG. 1, solenoid core 62 has been screwed onto a threaded portion 68 of valve member 22, however, those skilled in the art will readily appreciate that the solenoid core 62 could be attached to the valve means by a variety of methods while remaining in the scope of the current invention. Solenoid core 62 is formed of substantially ferromagnetic materials including iron, steel, nickel, cobalt or other magnetic alloys known in the art for the use as solenoid cores. The diameter 69 of solenoid core 62 is selected to provide at least a sliding fit and preferably an interference-free fit within bore 24. Annular solenoid coils 64 and 66 are disposed around housing 21 as shown in FIGS. 1 and 4. In a preferred embodiment, solenoid coils 64 and 66 comprise wire which has been wound directly onto the external surface of housing 21 and glued or otherwise fixed in place, however, separately wound solenoid coils are also within the scope of the invention. As shown in FIG. 4, it is further preferred that the ends of detent spring 23 not extend beyond the outside surface of housing 21 to avoid interference with the winding of the solenoid coils on the nearby exterior of the housing or with other structures near the switch. Solenoid coils 64 and 66 are positioned longitudinally adjacent one another and have a longitudinal midpoint 70 therebetween. Longitudinal midpoint 70 of solenoid coils 64, 66 is longitudinally aligned with the longitudinal midpoint of a portion 72 of bore 24 through which solenoid core 62 moves when valve member 22 moves from the first position to the second position.

In yet another embodiment, fluid switch 20 further comprises a means for positioning valve member 22 in bore 24 between the first position and second position. Numerous such positioning means for valve member 22 are known in the art. These means include additional fluid ports in housing 21 for hydraulic or pneumatic movement of valve member 22 by the application of differential fluid pressures to the longitudinal ends of valve member 22, a magnetic member attached to valve member 22 that is responsive to a movable magnetic member positioned on the exterior of housing 21, and mechanical members attached to valve member 22 and projecting from housing 21 for manual manipulation by an operator or mechanical manipulation by an external mechanism.

The aspects of the current invention previously discussed provide a fluid switch which has relatively few parts, even fewer moving parts, and which maintains its flow state in the absence of a continuous control signal. Additional preferred embodiments of the current invention provide for components which are easy to fabricate or improve the performance of the switch.

In a preferred embodiment of the current invention, valve member 22 has a maximum diameter 71 providing an interference-free fit within bore 24. Such an interference-free fit reduces the friction associated with moving valve member 22 between the first position and the second position, thereby reducing the control forces which must be provided by any positioning means. This also simplifies fabrication of valve member 22 and housing 21 by reducing the manufacturing tolerances required for these components. In some cases, however, the interference-free fit between valve member 22 and bore 24 may result in the leakage of working fluid. Thus, as shown in FIGS. 1 and 2A, in a more preferred embodiment of the current invention, annular ring grooves 74, 76 and 78 having reduced diameters 80, 82 and 84, respectively, may be provided on piston sections 46 and 48 of valve member 22. Resilient o-rings 86, 88 and 90 are positioned in each annular ring groove 74, 76 and 78, respectively. O-rings 86, 88 and 90 have an interference fit with bore 24, thereby providing fluid-tight seals against leakage of the working fluid. In a still more preferred embodiment of the current invention, two annular ring grooves 74, 78 with o-rings 86, 90 are provided on piston section 48 which is longitudinally aligned with outlet port 28 when valve member 22 is positioned at the first position. The grooves 74, 78 and o-rings 86, 90 are longitudinally spaced apart a distance 94 which is greater than the longitudinal width 92 to position the ring grooves and o-rings on longitudinally opposite sides of outlet port 28 (best seen in FIG. 3A) when valve member 22 is within the first position ensuring a fluid tight seal of outlet port 28.

In another preferred embodiment of the current invention, valve member 22 is a body of revolution formed about longitudinal axis 36. Referring again to FIGS. 1 and 2A, it can be seen that valve member can be fabricated on a lathe from a cylindrical rod having diameter 71 by reducing the diameter in rod section 42 to form the fluid passageway, by reducing the diameter at three locations 74, 76, 78 to form the annular ring grooves for the o-rings, by reducing the diameter of the end adjacent solenoid core 62 to form detent portion 40 and by threading extension 68 so that valve member 22 can be screwed into corresponding internal threads on solenoid core 62. Such diameter reduction and threading operations are easily accomplished on a lathe, making valve member 22 simple and inexpensive to fabricate.

In a further preferred embodiment of the current invention, in-bore portion 58 of detent spring 23 comprises a generally straight segment of hardened metal wire, such as spring steel or "piano wire." Steel wire is preferred for forming detent spring 23 because of its low cost, ready availability, and well-known material properties. Using a straight segment of wire reduces the complexity of both fabrication and assembly operations, thus further reducing costs. As shown in FIG. 4, the geometry of the current invention provides a detent spring 23 having a simple to fabricate, straight profile which resists undesired longitudinal movement of valve member 22, yet allows the spring to deflect such that the interference fit between in-bore portion 58 and intermediate section 54 of detent portion 40 allows valve member 22 to change position when control forces are present. These functions are accomplished without requiring complex mechanism as found in the prior art. In addition, by changing the diameter or material properties (such as hardness) of detent spring 23, the activation force, i.e., the force required to move the valve member from the first position to the second position or vice versa, can readily be changed by the operator without requiring a redesign of the remaining components. In addition, since valve member 22 is a body of revolution, assembly of fluid switch 20 is simplified since there is no need to maintain an angular alignment of valve member 22 within bore 24.

In a more preferred embodiment of the current invention, detent spring passage 30 comprises a hole formed completely through housing 21. As shown in FIG. 4, detent spring passage 30 can be formed by a single drilling operation which bores a hole through the walls of housing 21 which intersects bore 24. Where the in-bore portion 58 of detent spring 23 comprises a generally straight segment of wire, fluid switch 20 may be assembled simply by inserting valve member 22 into bore 24 such that detent portion 40 is adjacent to detent spring passage 30 and spool portion 38 is longitudinally proximate ports 26 and 28, then inserting detent spring 23 through detent spring passage 30, and then securing detent spring 23 in housing 21 using wire retaining means known to those of ordinary skill in the art including soldering, brazing, welding, or by using adhesives, by deforming the ends, or by using retaining clips.

Figure 2B:
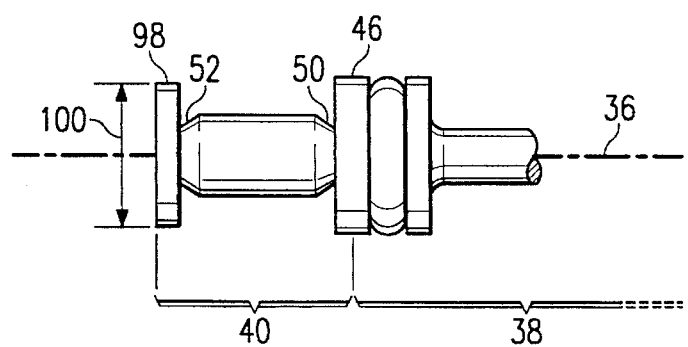
FIG. 2B is a partial side elevation view similar to FIG. 2A of a valve member having a stop member instead of a solenoid core.

Detent spring 23 may also serve to limit the overall longitudinal motion of valve member 22 within the range between the first position and the second positions shown in FIGS. 3A and 3B. As showing in FIGS. 1 and 2A, when detent portion 40 of valve member 22 is positioned longitudinally adjacent larger diameter structures such as piston section 46 and solenoid core 62, detent spring 23 will prevent movement of valve member 22 outside the desired range (e.g., between the first position and the second position). As those of ordinary skill in the art will readily appreciate, however, other configurations of fluid switch 20 are within the scope of the current invention, including configurations in which solenoid core 62 and associated solenoid coils 64 and 66 are either not present or are attached to valve member 22 at a different position. When detent portion 40 of valve member 22 is not otherwise flanked by structures having a radial height greater than that of the in-bore portion 58 of detent spring 23 (as best seen in FIG. 4, radial height is the distance measured from longitudinal axis 36 to the structure in question, e.g., the radial height of detent spring 23 is shown by distance 96), then one or more stop members 98 may be provided longitudinally adjacent tapered groove sections 50 or 52 on opposite ends of detent portion 40. In the example shown in FIG. 2B, a stop member 98 having diameter 100 is provided on the end of detent portion 40 adjacent tapered groove 52, while no stop member is required on the end adjacent tapered groove section 50 because adjacent piston section 46 of spool portion 38 has a diameter sufficient to engage detent spring 23.

In yet another a preferred embodiment, detent portion 40 comprises an intermediate section 54 having a constant diameter with a value D1 and first and second tapered groove sections 50 and 52 having a maximum diameter with a value D1 and a minimum diameter with a value D2, where the value D2 is less than the value D1. The detent portion 40 having the profile just described may be fabricated on a lathe without the use of complex operations. In such an embodiment, it is preferred that the detent spring 23 extend across bore 24 generally along a line offset from longitudinal axis 36 by a distance 96 having a value between 0.5 D1 and 0.5 D2. This spacing will provide for an interference-free fit between in-bore portion 58 of the detent spring when valve member 22 is within the first or second position and will provide for an interference fit between detent spring 23 and intermediate section 54 when valve member 22 is positioned between the first position and second position.

The fluid switch described above is simple to fabricate, has few moving parts and will remain in the open or closed position in the absence of a continuous control signal. In the preferred embodiment utilizing electromagnetic solenoids to position the valve means within the bore, the fluid switch will change states upon receipt of a single electrical pulse to the appropriate solenoid coil and will hold that state without the coils being continuously energized. In addition to providing a design having a small number of easy to fabricate components, this fluid switch allows the operator to change the mechanical force characteristics required to operate the valve simply by changing the diameter or material properties of the detent spring.

While the invention has been described in connection with a specific embodiment thereof and in a specific use, those of ordinary skill in the art will readily recognize that various modifications are possible within the scope of the invention as set forth in the attached claims.

I claim:

1. A fluid switch comprising:
   (a) a housing defining a generally cylindrical bore, an inlet port, an outlet port and a detent spring passage;
      said bore having a first end and a second end and a longitudinal axis therebetween;
      said inlet and outlet ports being longitudinally spaced-apart from one another and in communication with said bore to allow fluid flow thereamong;
      said detent spring passage being formed in said housing at a point longitudinally between said first end and said ports;
   (b) a valve member slidably disposed within said bore, said valve member having a longitudinal axis coincident with said longitudinal axis of said bore;

said valve member having a spool portion and a detent portion;

said valve member oriented in said bore to position said detent portion longitudinally adjacent said detent spring passage and said spool portion longitudinally proximate said ports;

said spool portion including a rod section having a reduced diameter connected longitudinally between two piston sections;

said detent portion including a first and a second tapered groove section and an intermediate section therebetween; each said tapered groove section having a diameter which decreases as the longitudinal distance from said intermediate section increases;

said valve member being positionable within said bore between a first position, when one of said piston sections of said spool portion is longitudinally aligned with said outlet port thereby blocking fluid communication between said inlet and outlet ports, and a second position, when said rod section of said spool portion is longitudinally aligned with said inlet and outlet ports thereby allowing fluid communication between said inlet and outlet ports;

said detent portion being adapted to position said first tapered groove section in longitudinal alignment with said detent spring passage when said valve member is in said first position, and to position said second tapered groove section in longitudinal alignment with said detent spring passage when said valve member is in said second position; and (c) a detent spring including an in-bore portion;

said in-bore portion extending through said detent spring passage and across said bore generally along a line offset from said longitudinal axis and perpendicular to a plane passing through said longitudinal axis;

said in-bore portion having an interference fit with said intermediate section of said detent portion when said valve member is between said first and said second positions;

said in-bore portion having an interference-free fit with said tapered groove sections of said detent portion when said valve member is in said first or said second position;

whereby longitudinal movement of said valve member is resisted when said valve member is in said first or second position.

2. A fluid switch according to claim 1 wherein said valve member is a body of revolution about said longitudinal axis.

3. A fluid switch according to claim 1 wherein said in-bore portion of said detent spring comprises a generally straight segment of hardened metal wire.

4. A fluid switch according to claim 1 wherein said in-bore portion of said detent spring is a generally straight segment of hardened metal wire extending from a first point on said bore to a second point on said bore.

5. A fluid switch according to claim 1 wherein said detent spring passage is a hole formed completely through said housing.

6. A fluid switch according to claim 1 wherein said detent portion further comprises:

said intermediate section having a constant diameter with a value D1; and said first and a second tapered groove sections having a maximum diameter with a value D1 and a minimum diameter with a value D2, the value D2 being less than the value D1.

7. A fluid switch according to claim 6 wherein said in-bore portion of said detent spring extends across said bore generally along a line offset from said longitudinal axis by an offset distance having a value between 0.5 D1 and 0.5 D2.

8. A fluid switch according to claim 1 wherein said detent portion further comprises:

two stop members positioned longitudinally adjacent said tapered groove sections on opposite ends of said detent portion;

said stop members contacting said in-bore portion of said detent spring when said valve member is in said first or said second position;

whereby said valve member is restricted from moving longitudinally beyond the range from said first to said second position.

9. A fluid switch according to claim 1 wherein said valve member has a maximum diameter providing an interference-free fit within said bore.

10. A fluid switch according to claim 9 further comprising:

an annular ring groove of reduced diameter formed on each said piston section of said valve member; and a resilient o-ring positioned in each said annular ring groove;

said o-rings having an interference fit within said bore.

11. A fluid switch according to claim 10 further comprising:

a second annular ring groove of reduced diameter formed on said piston section of said spool portion which is aligned with said outlet port when said valve member is positioned at said first position; and a second resilient o-ring positioned in said second annular ring groove; said o-ring having an interference fit within said bore;

said piston section being adapted to position said annular ring groove and said second annular ring groove, along with their respective o-rings, on longitudinally opposite sides of said outlet port when said valve member is in said first position.

12. A fluid switch according to claim 1 wherein said housing and said valve member are formed of substantially non-ferromagnetic materials.

13. A fluid switch according to claim 12 further comprising:

a solenoid core attached to said valve member;

said solenoid core formed of substantially ferromagnetic materials and having a diameter which provides an interference-free fit within said bore; and two annular solenoid coils disposed around said housing;

said solenoid coils positioned longitudinally adjacent one another and having a longitudinal midpoint therebetween;

said longitudinal midpoint of said solenoid coils being longitudinally aligned with a longitudinal midpoint of a portion of said bore through which said solenoid core moves when said valve member moves from said first position to said second position.

14. A fluid switch according to claim 1 further comprising means for positioning said valve member in said bore between said first position and said second position.

15. A fluid switch according to claim 14 wherein said positioning means comprise fluid ports in said housing for applying differential fluid pressure to the longitudinal ends of said valve member.

16. A fluid switch comprising:

a housing, a valve member, a positioner, and a detent spring;

said housing defining a generally cylindrical bore, an inlet port, an outlet port and a detent spring passage;

said bore having a first end and a second end and a longitudinal axis therebetween;

said inlet and outlet ports being longitudinally spaced-apart from one another and in communication with said bore to allow fluid flow thereamong;

said detent spring passage being formed in said housing at a point longitudinally between said first end and said ports;

said valve member slidably disposed within said bore, said valve member having a longitudinal axis coincident with said longitudinal axis of said bore;

said valve member having a spool portion and a detent portion;

said valve member oriented in said bore to position said detent portion longitudinally adjacent said detent spring passage and said spool portion longitudinally proximate said ports;

said spool portion including a rod section having a reduced diameter connected longitudinally between two piston sections;

said detent portion including a first and a second tapered groove section and an intermediate section therebetween; each said tapered groove section having a diameter which decreases as the longitudinal distance from said intermediate section increases;

said valve member being positionable within said bore between a first position, when one of said piston sections of said spool portion is longitudinally aligned with said outlet port thereby blocking fluid communication between said inlet and outlet ports, and a second position, when said rod section of said spool portion is longitudinally aligned with said inlet and outlet ports thereby allowing fluid communication between said inlet and outlet ports;

said detent portion being adapted to position said first tapered groove section in longitudinal alignment with said detent spring passage when said valve member is in said first position, and to position said second tapered groove section in longitudinal alignment with said detent spring passage when said valve member is in said second position;

said positioner having a first portion and a second portion capable of relative movement therebetween;

said first portion fixedly disposed relative to said housing;

said second portion attached to said valve member;

whereby relative movement between said first and second portions of said positioner moves said valve member between said first position and said second position; and said detent spring including an in-bore portion;

said in-bore portion extending through said detent spring passage and across said bore generally along a line offset from said longitudinal axis and perpendicular to a plane passing through said longitudinal axis;

said in-bore portion having an interference fit with said intermediate section of said detent portion when said valve member is between said first and said second positions;

said in-bore portion having an interference-free fit with said tapered groove sections of said detent portion when said valve member is in said first or said second position;

whereby longitudinal movement of said valve member is resisted when said valve member is in said first or second position.

17. A fluid switch according to claim 16 wherein said positioner is an electromechanical servo-actuator.

18. A fluid switch comprising:

(a) a housing defining a generally cylindrical bore, an inlet port, an outlet port and a detent spring passage;

said housing being formed of substantially non-ferromagnetic materials;

said bore having a first end and a second end and a longitudinal axis therebetween;

said inlet and outlet ports being longitudinally spaced-apart from one another and in communication with said bore to allow fluid flow thereamong;

said outlet port having a longitudinal width;

said detent spring passage being formed in said housing at a point longitudinally between said first end and said ports;

(b) a valve member slidably disposed within said bore between a first position and a second position, said valve member having a longitudinal axis coincident with said longitudinal axis of said bore;

said valve member being a body of revolution about said longitudinal axis formed of substantially non-ferromagnetic materials;

said valve member having a maximum diameter providing an interference-free fit within said bore;

said valve member having a spool portion and a detent portion;

said valve member oriented in said bore to position said detent portion longitudinally adjacent said detent spring passage and said spool portion longitudinally proximate said ports;

said spool portion including a rod section having a reduced diameter connected longitudinally between first and second piston sections;

said first piston section having first and second annular ring grooves of reduced diameter formed therein; said annular ring grooves being longitudinally spaced apart a distance greater than said longitudinal width of said outlet port;

said second piston section having a third annular ring groove formed therein;

said spool portion being adapted to position said first piston section in longitudinal alignment with said outlet port with said first and second annular ring grooves being on longitudinally opposite sides of said outlet port when said valve member is in said first position, and to position said rod section in longitudinal alignment with said inlet and outlet ports when said valve member is in said second position;

said detent portion including a first and a second tapered groove section and an intermediate section therebetween; each said tapered groove section having a diameter which decreases as the longitudinal distance from said intermediate section increases; said intermediate section having a constant diameter with a value D1; said first and a second tapered groove sections having a maximum diameter with a value D1 and a minimum diameter with a value D2, the value D2 being less than the value D1;

said detent portion being adapted to position said first tapered groove section in longitudinal alignment with said detent spring passage when said valve member is in said first position, and to position said second tapered groove section in longitudinal alignment with said detent spring passage when said valve member is in said second position;

(c) three o-rings;
one said o-ring positioned in each of said first, second and third annular ring grooves;
said o-rings having an interference fit within said bore;

(d) a detent spring including an in-bore portion comprising a generally straight segment of hardened metal wire;
said in-bore portion extending through said detent spring passage and across said bore generally along a line offset from said longitudinal axis by a distance having a value between 0.5 D1 and 0.5 D2, said line being perpendicular to a plane passing through said longitudinal axis;
said in-bore portion having an interference fit with said intermediate section of said detent portion when said valve member is between said first and said second positions;
said in-bore portion having an interference-free fit with said tapered groove sections of said detent portion when said valve member is in said first or said second position;

(e) a solenoid core attached to said valve member;
said solenoid core formed of substantially ferromagnetic materials and having a maximum diameter which provides an interference-free fit within said bore; and (f) two annular solenoid coils disposed around said housing;
said solenoid coils positioned longitudinally adjacent one another and having a longitudinal midpoint therebetween;
said longitudinal midpoint of said solenoid coils being longitudinally aligned with a longitudinal midpoint of a portion of said bore through which said solenoid core moves when said valve member moves from said first position to said second position;

whereby said valve member can be selectively positioned in said first position or said second position by energizing one said solenoid coil or the other.

* * * * *

UNITED STATES PATENT AND TRADEMARK OFFICE
CERTIFICATE OF CORRECTION

PATENT NO. : 5,653,421
DATED : August 5, 1997
INVENTOR(S) : Ellzey

It is certified that error appears in the above-indentified patent and that said Letters Patent is hereby corrected as shown below:

Column 2, line 18, replace "board" with --bore--.
Column 4, line 65 replace "extending" with --and extends--.
Column 4, line 65, replace "passage" with --passages--.
Column 6, line 13, before "Longitudinal" insert --As shown in FIG. 1,--.
Column 7, line 4, after "member" insert --22--.
Column 7, line 61, replace "showing" with --shown--.
Column 9, Claim 1, line 9, after "first" insert --tapered groove section--.
Column 9, Claim 1, line 16, replace "when" with --wherein--.
Colum 9, Claim 1, line 19, replace "when" with --wherein--.
Column 9, Claim 1, line 32, replace "in-bore portion" with --detent spring--.
Column 9, Claim 1, line 43, after "first" insert --position--.
Column 9, Claim 1, line 46, replace "first or second" with --first position or said second--.
Column 11, Claim 16, line 26, after "first" insert --tapered groove section--.
Column 11, Claim 16, line 32, replace "when" with --wherein--.
Column 11, Claim 16, line 36, replace "when" with --wherein--.
Column 11, Claim 16, line 57, replace "in-bore portion" with --detent spring--.
Column 11, Claim 16, line 64, after "first" insert --position--.
Column 11, Claim 16, line 65, replace "positions" with --position--.
Column 12, Claim 16, line 4, replace "first or second" with --first position or said second--.
Column 12, Claim 18, line 56, after "first" insert --tapered groove section--.

UNITED STATES PATENT AND TRADEMARK OFFICE
CERTIFICATE OF CORRECTION

PATENT NO. : 5,653,421
DATED : August 5, 1997
INVENTOR(S) : Ellzey

It is certified that error appears in the above-identified patent and that said Letters Patent is hereby corrected as shown below:

Column 13, Claim 18, line 13, replace "in-bore portion" with --detent spring--.

Signed and Sealed this

Thirteenth Day of January, 1998

Attest:

BRUCE LEHMAN

Attesting Officer

Commissioner of Patents and Trademarks